US009512955B2

(12) United States Patent
Mendo

(10) Patent No.: US 9,512,955 B2
(45) Date of Patent: Dec. 6, 2016

(54) TRIPOD FOR SUPPORTING VIDEO/PHOTOGRAPHIC EQUIPMENT

(71) Applicant: LINO MANFROTTO + CO. S.p.A., Cassola (PD) (IT)

(72) Inventor: Andrea Mendo, Rossano Veneto (IT)

(73) Assignee: LINO MANFROTTO + CO. S.P.A., Cassola (PD) (IT)

( * ) Notice: Subject to any disclaimer, the term of this patent is extended or adjusted under 35 U.S.C. 154(b) by 0 days.

(21) Appl. No.: 14/431,302

(22) PCT Filed: Sep. 27, 2013

(86) PCT No.: PCT/EP2013/070183
§ 371 (c)(1),
(2) Date: Mar. 25, 2015

(87) PCT Pub. No.: WO2014/053412
PCT Pub. Date: Apr. 10, 2014

(65) Prior Publication Data
US 2015/0240986 A1    Aug. 27, 2015

(30) Foreign Application Priority Data
Oct. 5, 2012 (IT) .............. PD2012A0291

(51) Int. Cl.
| | |
|---|---|
| *A47F 5/00* | (2006.01) |
| *F16M 11/18* | (2006.01) |
| *F16M 11/04* | (2006.01) |
| *F16M 11/16* | (2006.01) |

(Continued)

(52) U.S. Cl.
CPC ............ *F16M 11/18* (2013.01); *F16M 11/045* (2013.01); *F16M 11/046* (2013.01); *F16M 11/105* (2013.01); *F16M 11/16* (2013.01); *F16M 11/242* (2013.01); *F16M 13/00* (2013.01)

(58) Field of Classification Search
CPC .... F16M 11/32; F16M 11/14; F16M 11/242; F16M 11/04; F16M 11/06; F16M 13/00; F16M 11/105
USPC ......... 248/124.1, 176.1, 177.1, 187.1, 286.1, 248/287.1; 396/419
See application file for complete search history.

(56) References Cited

U.S. PATENT DOCUMENTS 4,283,152 A * 8/1981 Smith ................... F16B 7/0486
                                                                               256/65.01
4,911,390 A * 3/1990 Flick ....................... A47B 3/12
                                                                               182/186.3

(Continued)

FOREIGN PATENT DOCUMENTS

| CN | 201547463 U | 8/2010 |
|---|---|---|
| DE | 3134910 | 3/1983 |

(Continued)

OTHER PUBLICATIONS

ISR and Written Opinion in matter PCT/EP2013//07183 dated Oct. 25, 2013.

(Continued)

*Primary Examiner* — Todd M Epps
(74) *Attorney, Agent, or Firm* — Kristina Castellano; Castellano PLLC

(57) ABSTRACT

A tripod for supporting video/photographic equipment comprises: a spider (2) on which are articulated a plurality of legs (3); a column (5) engaged in the spider and slidable in a first direction (X) between a retracted position, in which a supporting surface of the photographic equipment is close to the spider, and an extended position, in which the supporting surface (7) is remote from the spider; and an auxiliary positioning element (10) associated with the spider and comprising a seat (12) provided to house the column (5) in engaged manner in such a way as to be able to slide in a second direction (Y), which differs from the first direction (X). The seat (12) is provided on a sleeve (11) engaged in the spider (2) in such a way as to be able to slide in the first direction (X), between a non-operational position in which the seat (12) is concealed inside the spider and an operating position in which the seat (12) projects out from the spider to permit the column to slide in the second direction (Y).

11 Claims, 5 Drawing Sheets

(51) Int. Cl.
*F16M 11/24* (2006.01)
*F16M 13/00* (2006.01)
*F16M 11/10* (2006.01)

(56) References Cited

U.S. PATENT DOCUMENTS 5,839,712 A * 11/1998 Wang ................... B43M 99/003
211/69.5
2009/0250567 A1* 10/2009 Raynaud ................ F16M 11/32
248/168

FOREIGN PATENT DOCUMENTS

| EP | 0952383 A2 | 10/1999 |
| FR | 1432624 A | 3/1996 |
| GB | 503898 | 8/1938 |
| WO | 03/083350 A1 | 10/2003 |

OTHER PUBLICATIONS

IPRP in matter PCT/EP2013//07183 dated Nov. 5, 2014.

* cited by examiner

TRIPOD FOR SUPPORTING VIDEO/PHOTOGRAPHIC EQUIPMENT

CROSS REFERENCE TO RELATED APPLICATIONS

This application is a U.S. National Stage Application of PCT/EP2013/070183 filed on Sep. 27, 2013, which claims priority to Italian patent application PD2012A000291 filed on Oct. 5, 2012, the contents of both of which are incorporated herein by reference.

TECHNICAL FIELD

The present invention concerns a support tripod with a capsizable column for photographic equipment, having the features outlined in the precharacterising clause of the main claim.

TECHNOLOGICAL BACKGROUND

It is widely known in the technical sector of photography, to use support stands for photographic equipment and, among these, tripods are particularly widespread and popular at both amateur and professional level. Generally speaking, these comprise a plurality of legs, generally telescopic, all hinged to a spider in which is slidably engaged a support column, to one end of which the photographic equipment is fastened.

One of the disadvantages inherent in the use of tripods is the relative inflexibility in positioning the photographic equipment.

U.S. Pat. No. 6,164,843, in the name of the same Applicant, describes a tripod that offers a first solution to this disadvantage.

The tripod disclosed in that patent is equipped with a pair of opposed jaws, mounted on the spider on the side opposite the legs, which define a seat with an axis substantially perpendicular to that of the spider, along which the column can slide.

The latter can therefore be intentionally removed from the spider and positioned inside the pair of jaws, between which it is slid in a direction perpendicular to that permitted by engagement with the spider.

This tripod therefore offers increased flexibility of engagement with the column, which can slide vertically within the spider or, alternatively, horizontally within the pair of jaws. This facilitates, for example, remote positioning close to the ground, which is useful for shots of flowers, insects etc. in "macro" mode.

The tripod described in the prior art mentioned above does, however, have some drawbacks.

A first drawback comes from the fact that providing the jaws on the spider means increasing the overall dimensions of the tripod, which turns out to be unpopular with users seeking the greatest possible compactness in this type of equipment when the tripod is in the closed configuration, so as not to affect negatively its transportation and storage.

A second drawback arises from the fact that, in order to insert it into the pair of jaws, the column must be physically separated from the spider, with consequent risk that this and the photographic equipment mounted on it could fall.

It should be noted that, in the following description and claims, the term "tripod" is intended to refer to a stand equipped with a spider on which a plurality of legs are articulated, with no specific limitation on the actual number of legs, which may be three or a number other than three.

DESCRIPTION OF THE INVENTION

The problem forming the basis of the present invention is that of producing a tripod with a capsizable column for photographic equipment, structurally and functionally designed for overcoming the limitations set out above with reference to the prior art mentioned.

Within the scope of this problem, an aim of the invention is to produce a tripod in which changing the position of the column is easy, fast and safe. This problem is resolved and this aim is achieved by the present invention, by means of a tripod with a capsizable column, produced according to the following claims.

BRIEF DESCRIPTION OF THE DRAWINGS

The characteristics and advantages of the invention will be more apparent from the detailed description of a preferred exemplary embodiment, illustrated non-restrictively and for information with reference to the attached drawings in which.

PREFERRED EMBODIMENT OF THE INVENTION

Figure 1:
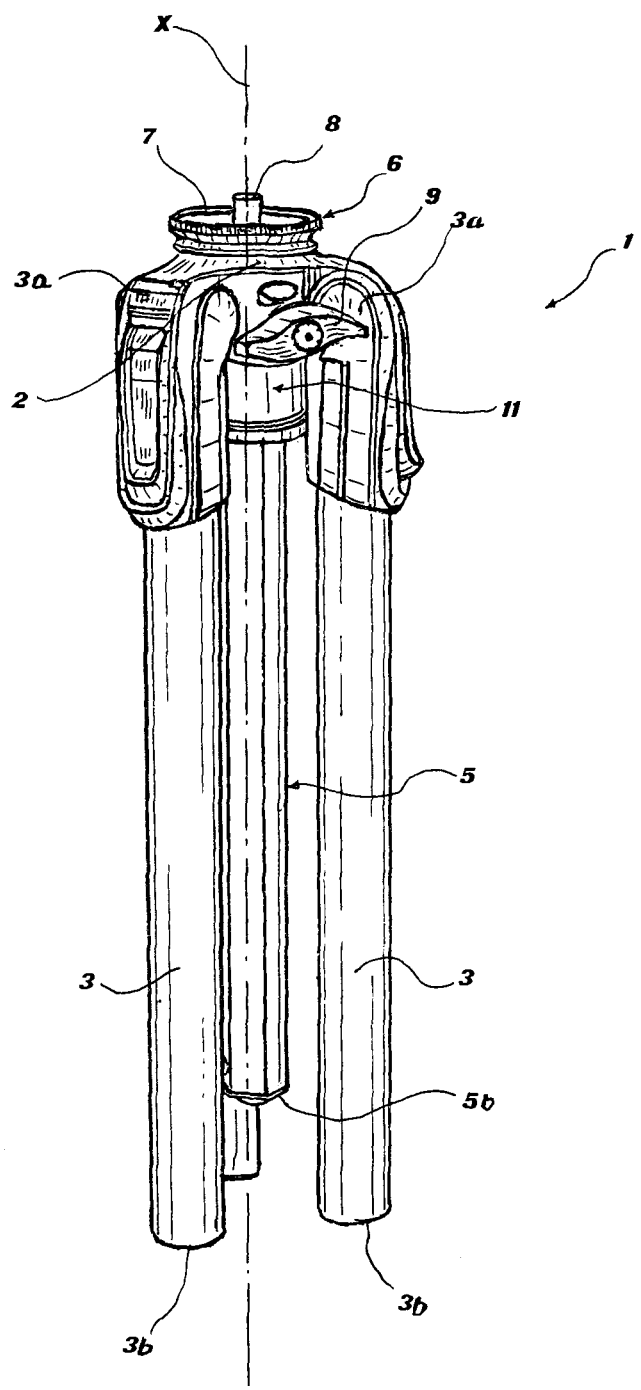
FIG. 1 is a perspective view of a tripod with a capsizable column, in the closed configuration, produced according to the present invention.

In the figures the numeral 1 refers to a tripod produced according to the present invention.

The tripod 1 comprises a spider 2 on which are articulated a plurality of legs, all indicated with reference numeral 3.

The legs 3 are preferably telescopic and are articulated to the spider 2 at their respective first end 3a, while an opposite second end 3b is intended for support on the ground.

Each leg 3 is provided with means for locking the respective telescopic extension and is articulated so as to swivel between a closed configuration (shown in FIG. 1), in which the legs 3 are brought close together, and an open configuration, in which the second ends 3b of the legs 3 are moved apart so as to increase the plane of support on the ground for the tripod 1. A through opening 4 with a substantially cylindrical cross-section, on the axis X, is produced on the spider 2, defining what is known as a "panoramic" axis for the tripod 1.

The tripod 1 further comprises a column 5 on one of the ends 5a of which a plate 6 is provided, on which is defined a supporting surface 7 for a photographic equipment not shown in the figures.

The supporting surface 7 is substantially perpendicular to the axis of the column 5 and the plate 6 is preferably equipped with removable attachment means, for example comprising a threaded pin 8, to anchor the photographic equipment to the tripod 1 at the support surface 7.

In a first configuration of the tripod 1, the column 5 is housed, in engaged manner, in the opening 4 of the spider 2 so as to be able to slide along the axis X, between a retracted position in which the plate 6 is close to the spider 2, substantially up against the latter (see FIGS. 1 and 2), and an extended position in which the plate 6 is remote from the spider 2. The axis X therefore defines a first direction in which the column 5 can slide relative to the spider 2.

A locking member 9, for example of the type comprising a slider that can be moved by a threaded pin inside the opening 4 against the column 5, is provided on the spider 2 to lock the column 5 in a desired position relative to the spider 2 in its displacement along the axis X.

According to a first aspect of the present invention, the tripod 1 further comprises an auxiliary positioning element, indicated overall by the numeral 10, which is associated with the spider 2 to allow the column 5 to slide in a second direction Y, which differs from the first direction defined by the axis X.

The auxiliary positioning element 10 comprises a sleeve 11, on which a seat 12 is provided, capable of housing the column 5 in engaged manner in such a way as to be able to slide along the second direction Y.

The sleeve 11 is housed, in engaged manner, in the opening 4 of the spider 2 so as to be able to slide along the axis X, between a non-operational position in which the seat 12 is concealed inside the spider 2 and an operating position in which the seat 12 projects out from the spider 2 to allow it to be engaged by the column 5.

The sleeve 11 is coaxial with the opening 4 and is interposed between the spider 2 and the column 5, such that the latter slides along the axis X within the sleeve 11.

The sleeve 11 has a generically cylindrical shape, open at its longitudinally opposite ends, and extending along the axis X, between a first end 11a facing the plate 6 of the column 5 and a second end 11b longitudinally opposite, by a measurement slightly greater than the sum of the dimension of the spider 2 along the axis X (thickness of the spider) and the diameter of the column 5, typically between about 60 mm and about 70 mm.

Consequently, when moved into its non-operational position, the sleeve 11 projects from the spider 2 at its second end 11b, while the seat 12 in fact remains concealed inside the spider 2. Conversely, when moved into its operating position, the sleeve 11 projects from the spider 2 at its first end 11a facing towards the plate 6 of the column 5, thus making the seat 12 accessible from the exterior.

The ends 11a and 11b are suitably flanged, such that the sleeve 11 can slide relative to the spider 2 in the first direction X by a measurement substantially equal to its longitudinal dimension without, however, completely coming out of the opening 4 of the spider 2.

Figure 6:
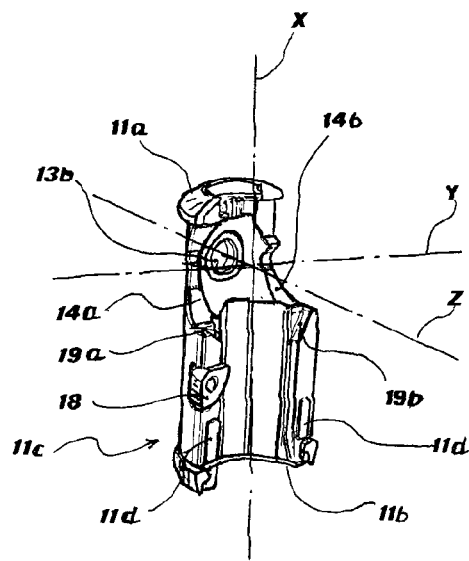
FIG. 6 is a view in longitudinal section of a first component of the tripod in FIG. 1.
Figure 7:
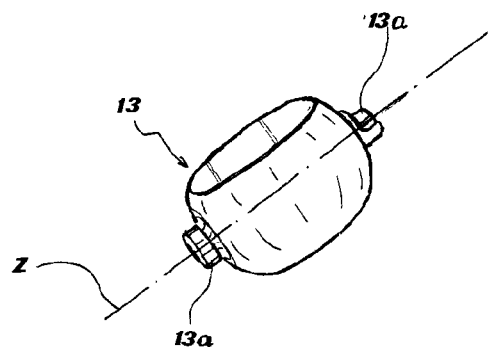
FIG. 7 is a perspective view of a second component of the tripod in FIG. 1.

In the preferred embodiment described here, the sleeve 11 comprises a pair of semicylindrical shells 11c (one of which is illustrated in FIG. 6), facing each other and engaged so as to be coupled by means of a pair of appendages 11d extending from one of the two semicylindrical shells 11c and housed in the corresponding seats made on the other one of the two semicylindrical shells 11c.

In this way, the two shells maintain a limited capacity for reciprocal translation in a radial direction, such that the two semicylindrical shells can be moved towards or away from each other. This allows the column 5 to be clamped between the two semicylindrical shells 11c in a desired position, by the action of the slider of the locking member 9. Furthermore, the configuration of the two semicylindrical shells 11c makes it easier to produce the sleeve 11 by moulding and position it during the phase of assembling the tripod 1.

In an alternative embodiment of the tripod, not illustrated here, the sleeve 11 can be formed from a single cylindrical part, provided nonetheless with a longitudinal slot that allows for the possibility of elastic contraction to clamp the column 5 inside it through the action of the locking member 9.

At a second end 5b of the column 5, longitudinally opposite the first end 5a, an abutment element 15 is provided, formed in this exemplary embodiment by a tooth, which projects radially from the column 5. The abutment element 15 is urged to project out from the column 5 by a spring 16 and can nevertheless be displaced radially into the column by a user-operated control button 17.

The abutment element 15 is further capable of coupling with the seat 12 to drag said seat and, together with it, the entire sleeve 11 from the non-operational position into the operating position by the procedure described in detail later in the description.

The sleeve 11 comprises a stop element 18 capable of abutting against the spider 2 in a locking position, in which unwanted displacement of said sleeve 11 from the non-operational position is prevented.

The stop element 18 is mounted on a side wall of the sleeve 11 in an intermediate position between the ends 11a and 11b, at a distance from the first end 11a of a little more than the thickness of the spider 2, as explained more clearly later in the description.

Moreover, the stop element 18 is advantageously mounted on the sleeve 11 in such a way as to be able to swivel between a locked position, in which it is projecting from the sleeve 11 and able to abut against the spider 2, and a sliding position, in which it does not interfere with the spider 2 and permits the displacement of the sleeve 11 in the first direction X towards the operating position.

Figure 3:
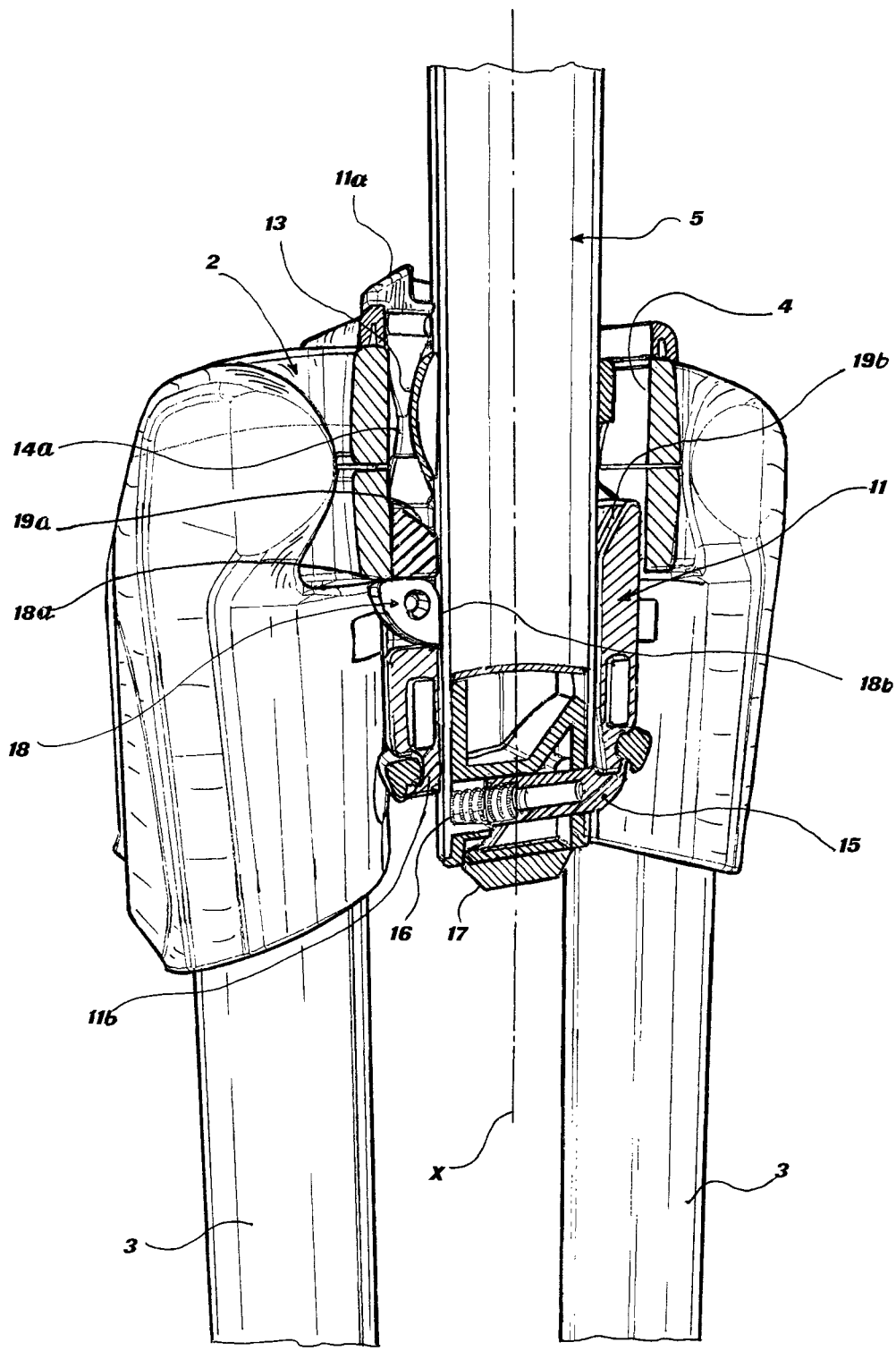
FIG. 3 is a view in longitudinal section of one portion, on an enlarged scale, of the tripod in FIG. 1 with the column in the extended position.
Figure 4:
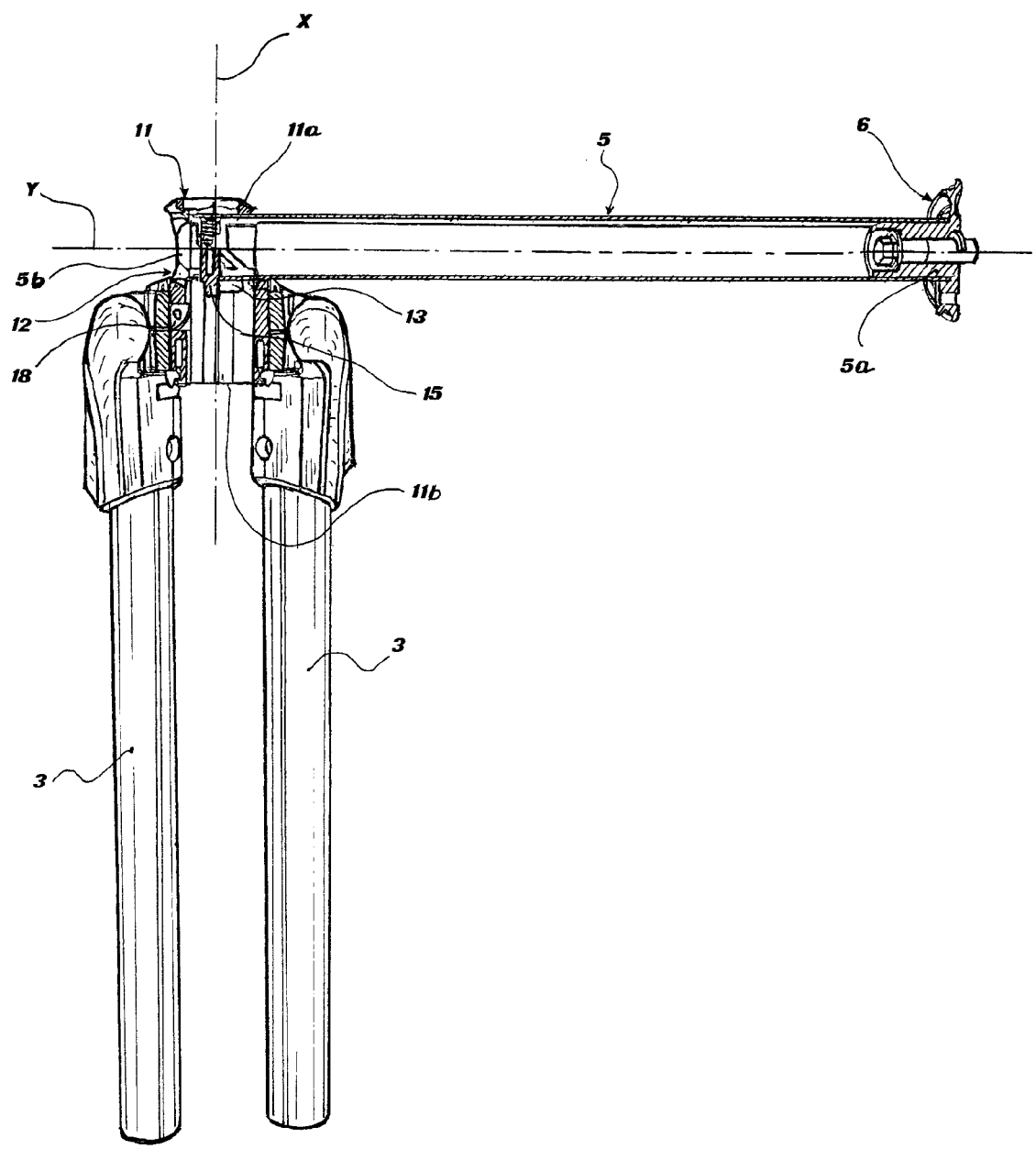
FIG. 4 is a view in longitudinal section of the tripod in FIG. 1 with the column placed in a position different from that in FIG. 1.
Figure 5:
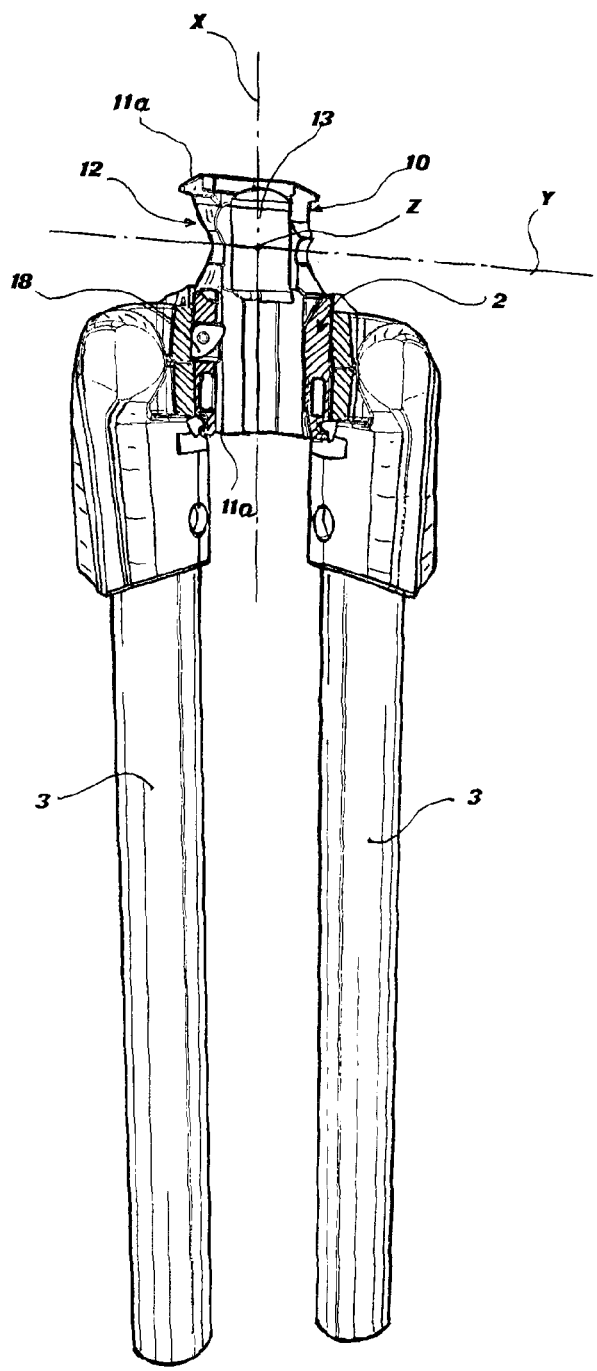
FIG. 5 is a view of the tripod in FIG. 4 without the column.

Preferably, the stop element 18 is based on a circular sector with a first side and a second side respectively indicated as 18a and 18b (substantially perpendicular to each other), which in the swivelling motion described above alternately project out from the sleeve 11 or into the wall of the sleeve 11, as clearly visible in FIGS. 3 and 5.

Therefore, with the stop element 11 swivelled to its locking position, the first side 18a projects out from the wall of the sleeve 11, while the second side 18b is within or flush with that wall. In particular, the stop element 18 is positioned at a distance from the first end 11a such that it abuts on the spider 2 on the side opposite the first end 11a, exactly when the sleeve 11 is in a non-operational position, preventing it from being displaced relative to the spider 2 in the first direction X. At the same time, as the second side 18b is not projecting into the sleeve 11, the stop element 18 does not interfere with the sliding of the column 5 within the sleeve 11.

Conversely, when the stop element 18 is swivelled into the sliding position of the sleeve 11, the first side 18a is retracted within (or flush with) the wall of the sleeve 11 while the second side 18b projects into the sleeve 11.

Furthermore, it will be noted that the swivelling of the stop element 18 from the locking position is prevented if the column 5 is present inside the sleeve 11 in line with the stop element 18, with the second side 18b abutting against said column.

The seat 12 comprises a ring element 13 mounted on the sleeve 11 at the first end 11a so as to encircle the column 5, which slides through it.

The ring element 13 comprises a pair of diametrically opposite pins 13a housed in a corresponding pair of holes 13b made on the sleeve 11, so that it can advantageously be swivelled about an axis of rotation Z, perpendicular to the axis X, in such a way that its axis is displaced angularly from the first direction X to the second direction Y. Preferably, the swivelling of the ring element 13 is limited between these two angular positions by respective locks.

Preferably, the angle of swivelling about the axis Z is such that the first and second directions X and Y are substantially perpendicular to each other.

On the side wall of the sleeve 11, in line with the ring element 13 and positioned on the opposite side along a diameter perpendicular to the axis Z, the following are provided: a hole 14a, with a closed contour, through which the column 5 can slide, and a recess 14b with an open contour connected to the longitudinal opening of the sleeve 11.

On the side wall of the sleeve 11, adjacent to the hole 14a and the recess 14b, a first and a second bevel 19a and 19b are provided, having a plane inclined towards the inside of the sleeve 11.

The tripod 1 is operated by the user in the following manner.

Figure 2:
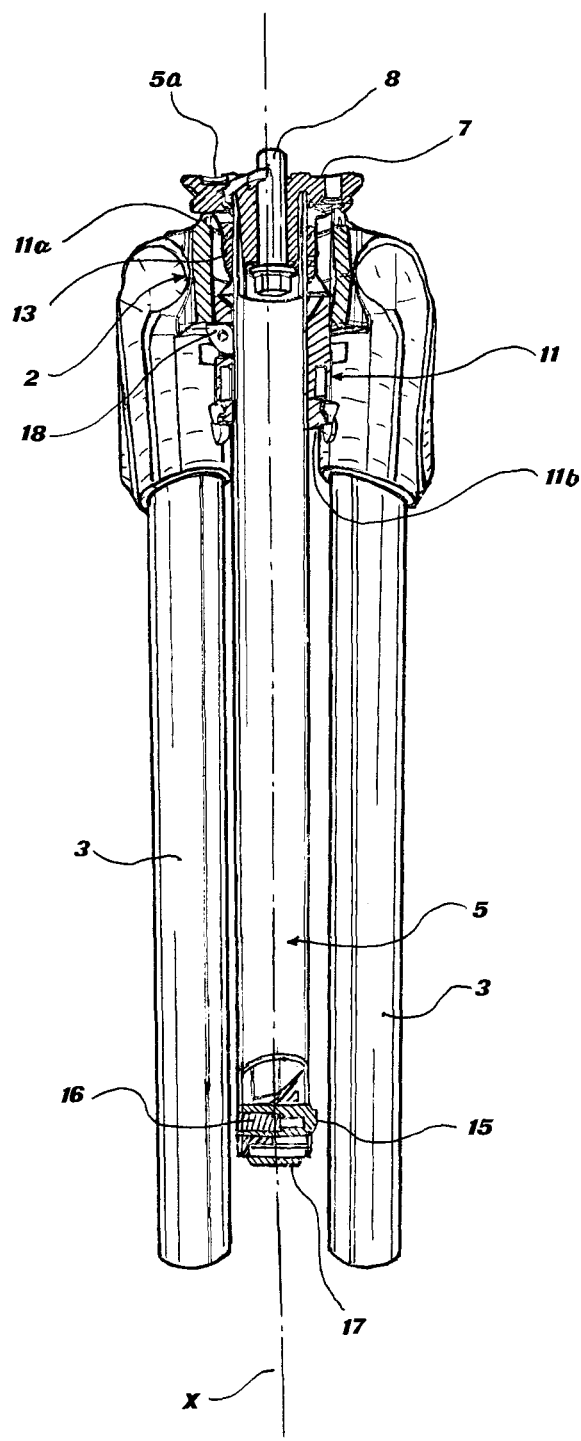
FIG. 2 is a view in longitudinal section of the tripod in FIG. 1 with the column in the retracted position.

In the closed configuration illustrated in FIG. 1, the tripod 1 has its legs 3 drawn together and up against the axis X, the column 5 is lowered into the retracted position, so that the plate 6 abuts against the spider 2 and its remaining portion projects out from the spider 2 on the side of the legs 3, while the sleeve 11 is in the non-operational position.

The tripod can be opened and supported on the ground, by acting on the legs 3 and the column 5 lifted from the spider 2, causing it to slide in the first direction X to the desired height.

When the column 5 is displaced in the first direction X into the extended position, the abutment element 15, projecting from the column 5, meets the second end 11b of the sleeve 11, preventing any further displacement of the column 5 inside the sleeve 11.

As stated above, in this position the sleeve 11 cannot be displaced from the non-operational position, since it is retained by the combined action of the stop element 18 and the first end 11a.

By retracting the abutment element 15 into the column 5 by acting on the control button 17, the column 5 can slide further into the sleeve 11 until the abutment element 15 meets the ring element 13, coupling with the seat 12. Further traction on the column 5 produces the displacement of the sleeve 11 in the first direction X until it reaches the operating position. At the point when the abutment element 15 actually couples with the seat 12, the sleeve 11, at the level of the stop element 18 is no longer occupied by the column 5, and therefore the stop element 18 can swivel into the sliding position in which the sleeve 11 can slide freely with respect to the spider 2.

Once the sleeve 11 is displaced into the operating position, with the seat 12 projecting from the spider 2, the column 5 is swivelled about the axis of rotation Z of the ring element 13, engaging with the recess 14b, until it reaches an angular position that sets it parallel to the second direction Y.

At this point the column 5 can be moved in said second direction Y through the ring element 13 and the hole 14a as far as the desired position without interfering with the spider 2.

It will be noted that, due to the bevel 19a provided, the abutment element 15 is urged against the spring 16 so as to enter the column 5, without said element impeding the second end 5b of the column 5 from coming out of the hole 14a.

To return the tripod 1 to the closed starting position, the column 5 is moved in the second direction Y until its second end 5b reaches out of the hole 14a, entering into the sleeve 11, after the button 17 is operated. Next, the column 5 is swivelled about the axis Z of the ring element 13 until it returns parallel to the first direction X and is therefore moved inside the sleeve 11.

With this action the abutment element 15 abuts against the bevel 19b, causing the sleeve 11 to be moved towards the non-operational position and, simultaneously, the abutment element 15 to be retracted into the column 5.

If the action of the abutment element 15 were not sufficient to completely move the sleeve 11 into the non-operational position, this would nonetheless be achieved by the interference caused by the stop element 18 (projecting into the sleeve 11) with the second end 5b of the column 5. In fact, until the stop element 18 is located inside the opening 4, said stop element 18 cannot swivel since the first side 18a abuts against the spider 2, such that the second side 18b remains projecting into the sleeve 11, liable to be propelled in the first direction X out of the column 5.

At the point where the sleeve 11 reaches the non-operational position, the stop element 18 comes out of the opening 4 and can swivel into the locking position, allowing the column 5 to slide further into the sleeve 11.

When the second end 5b of the column 5 comes out of the second end 11b of the sleeve 11, the abutment element 15 is pushed, under the action of the spring 16, radially towards the outside of the column 5, which can be lowered into the retracted position.

The tripod 1 can therefore be returned to the closed configuration.

It will be recognised that, thanks to the characteristics of the present invention, the space taken up by the tripod in this configuration is substantially the same as that of a traditional tripod that does not provide the possibility of auxiliary positioning for the column, greatly reducing the longitudinal dimension of the tripod, by an order of 50-60 mm, compared with the tripod described in U.S. Pat. No. 6,164,843.

The present invention therefore resolves the problem complained of above with reference to the cited prior art, and at the same time offers numerous other advantages, including the fact that the column can be placed in a horizontal position extremely quickly and safely, without the need to detach the column from the spider.

The invention claimed is:

1. A tripod for supporting video/photographic equipment comprising:
   a spider on which are articulated a plurality of legs of said tripod;
   a column at one first end of which is provided a supporting surface for said photographic equipment, said column being engaged in said spider in such a way as to be able to slide along a first direction (X) between a retracted position, in which said supporting surface is close to said spider, and an extended position, in which said supporting surface is remote from said spider;

an auxiliary positioning element associated with said spider and comprising a seat arranged to receive said column in engaged manner in such a way as to be able to slide along a second direction (Y) which differs from said first direction (X), wherein said auxiliary positioning element comprises a sleeve on which said seat is provided, said sleeve being engaged in said spider in such a way as to be able to slide along said first direction (X), between a non-operational position in which said seat is concealed inside said spider and an operating position in which said seat projects out from said spider to permit said column to slide along said second direction (Y).

2. The tripod according to claim 1, in which said sleeve is slidable within a through opening located on said spider, said opening extending along an axis (X) defining said first direction.

3. The tripod according to claim 1, in which said column is slidable along said first direction (X) within said sleeve.

4. The tripod according to claim 1, in which, on said column there is provided an abutment element of said sleeve, such that said sleeve is displaced between said non-operational position and said operating position as a result of motion of said column along said first direction (X).

5. The tripod according to claim 1, in which said sleeve comprises a stop element capable of abutting against said spider in a locking position, in which unwanted displacement of said sleeve from said non-operational position is prevented.

6. The tripod according to claim 5, in which said stop element is maintained in said locking position by the presence of said column within said sleeve.

7. The tripod according to claim 4, in which, when said column is displaced into said extended position, said abutment element interferes with said sleeve so as to prevent further displacement of said column within said sleeve along said first direction.

8. The tripod according to claim 7, in which, on said column, there is provided a control button for displacing said abutment element relative to said column, so as to eliminate said interference with said sleeve and permit said further displacement of said column within said sleeve along said first direction (X).

9. The tripod according to claim 4, in which said abutment element is capable of coupling with said seat to drag said sleeve from said non-operational position towards said operating position.

10. The tripod according to claim 1, in which said seat comprises an annular element through which said column slides, said annular element being mounted swivellably on said sleeve so as to permit said column to swivel between said first direction (X) and said second direction (Y).

11. The tripod according to claim 5, in which said stop element is mounted on said sleeve in a position spaced from said seat , such that when said abutment element is coupled in said seat, said column does not prevent said stop element from being displaced from said locking position.

* * * * *